United States Patent
Pelloux-Gervais et al.

(10) Patent No.: US 6,519,950 B2
(45) Date of Patent: Feb. 18, 2003

(54) DEVICE FOR STORING GAS UNDER PRESSURE

(75) Inventors: Pierre Pelloux-Gervais, Seyssins (FR); Patrick Sanglan, Seyssins (FR)

(73) Assignee: L'Air Liquide, Societe Anonyme a Directoire et Conseil de Surveillance pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 09/963,522

(22) Filed: Sep. 27, 2001

(65) Prior Publication Data

US 2002/0046567 A1 Apr. 25, 2002

(30) Foreign Application Priority Data

Oct. 19, 2000 (FR) .............................................. 00 13381

(51) Int. Cl.⁷ .............................. F17C 1/00; F17D 1/00; E03B 11/00
(52) U.S. Cl. .......................... 62/45.1; 220/581; 137/259
(58) Field of Search .................. 62/45.1, 48.3, 62/54.1, 48.1; 137/259; 220/581

(56) References Cited

U.S. PATENT DOCUMENTS

| | | | | |
|---|---|---|---|---|
| 3,232,725 A | * | 2/1966 | Secord et al. .................. 48/190 |
| 3,304,729 A | * | 2/1967 | Chandler et al. ............. 62/48.3 |
| 3,848,427 A | * | 11/1974 | Loofbourow ................. 62/260 |
| 3,950,958 A | * | 4/1976 | Loofbourow ................ 62/45.1 |
| 4,559,786 A | * | 12/1985 | Schuck ........................ 62/55.1 |
| 5,520,000 A | * | 5/1996 | Pevzner ...................... 62/48.1 |
| 5,803,005 A | * | 9/1998 | Stenning et al. .............. 114/72 |
| 5,839,383 A | * | 11/1998 | Stenning et al. .............. 114/72 |

FOREIGN PATENT DOCUMENTS

FR 2 572 161 4/1986

* cited by examiner

*Primary Examiner*—William C. Doerrler
(74) *Attorney, Agent, or Firm*—Young & Thompson

(57) ABSTRACT

A device for storing gas includes at least one container (1) for gas, of the high pressure type, that has an outlet conduit with which is associated a branch (5) ensuring a closeable calibrated loss. The gas is in gaseous phase in this container over a range of pressures extending from about 40 to 250 bars and preferably from 50 to 200 bars and over a range of temperatures extending from about 15° K to 210° K and preferably from 20° K to 200° K. The device includes a thermally insulating envelope (2) in which the container (1) is disposed.

24 Claims, 1 Drawing Sheet

DEVICE FOR STORING GAS UNDER PRESSURE

BACKGROUND OF THE INVENTION

The invention relates to the storage and transportation of gas and more particularly to a device for the storage of gas under pressure permitting the storage and transportation of gas in a form that does not preliminarily require long and difficult treatment.

At present, gas is stored and transported in containers, in the liquid phase, or in the gaseous phase under pressure at ambient temperature.

The liquefaction of the gases is financially and energetically costly; particularly, in the case of hydrogen, the temperature is very low (20 K), the latent heat is high, and it is necessary to pass through an ortho-para transformation phase.

The storage under pressure (so called HP storage), for example about 200 bars, requires relatively heavy cylinders, for a relatively small quantity of gas. The increase in pressure (storage under very high pressure, or VHP) implies in the present state of the art, cylinders that are wound with filament, but these cylinders are very costly, and the compression means are not adapted for high flow rates; moreover, for a gas such as hydrogen, storage at 700 bars at 290 K represents only 225 Nm$^3$ of gas per cubic meter of volume of the container, which is to say less than 60% of the volume in liquid phase at two atmospheres at absolute pressure (750 Nm$^3$ of gas per cubic meter of volume of the container).

As a result, in such a case, the placing of gas under very high pressure is not of much interest.

SUMMARY OF THE INVENTION

The invention has for its object to overcome these drawbacks of the known devices, and more particularly to prevent storing, particularly for its transportation, the maximum of gas in the smallest volume and weight possible, at least cost.

To this end, the invention relates to a device for the storage of gas under pressure, characterized in that it comprises at least one container for the gas of the high pressure type, comprising an outlet conduit with which is associated a means ensuring a closeable calibrated loss, the gas being in the gaseous condition in this container over a range of pressures extending from about 40 to 250 bars and preferably from 50 to 200 bars and over a range of temperatures extending from about 15 K to about 210 K, and preferably 20 K to u, and a thermal insulation envelope in which the container is disposed.

Thanks to these characteristics, for example for hydrogen, it is possible to process large quantities of gas in a short time by means of conventional compression installations of high flow rate, without the ortho-para transformation which is highly consumptive of energy, and by using cylinders of relatively low weight using materials conventionally selected.

The invention can moreover have one or several of the following characteristics:

- the container comprises means for recovering cold from the expansion of the gas;
- the container is provided with means forming a heat exchanger adapted to be used before its filling with cold gas so as to cool it before its filling;
- the container comprises an outlet conduit provided with an outlet control valve, and the means ensuring a closeable calibrated loss comprise a parallel branch on the valve;
- the device comprises several containers within an envelope;
- the device comprises at least one container within a Dewar container, other than the container, of liquid nitrogen;
- the container contains a gas at a pressure of the order of 200 bars;
- the container contains hydrogen in gaseous phase, and at a temperature comprised in a range extending from about 40 K to 120 K;
- the container contains hydrogen in gaseous phase, and at a temperature of the order of 80 K, for example 77 K;
- the container contains helium in gaseous phase, and at a temperature comprised within a range extending from about 20 K to 80 K;
- the container contains neon in gaseous phase, and at a temperature comprised in a range extending from about 50 K to about 70 K;
- the container contains carbon monoxide in gaseous phase, and at a temperature comprised in a range extending from about 140 K to 200 K; and
- the container contains methane in gaseous phase, and at a temperature comprised within a range extending from about 145 K to 200 K.

BRIEF DESCRIPTION OF THE DRAWINGS

Other characteristics and advantages of the invention will become apparent from the following description of embodiments of the invention given by way of nonlimiting examples, illustrated by the accompanying drawings, in which.

DETAILED DESCRIPTION OF THE PREFERRED EMBODIMENTS

Figure 1:
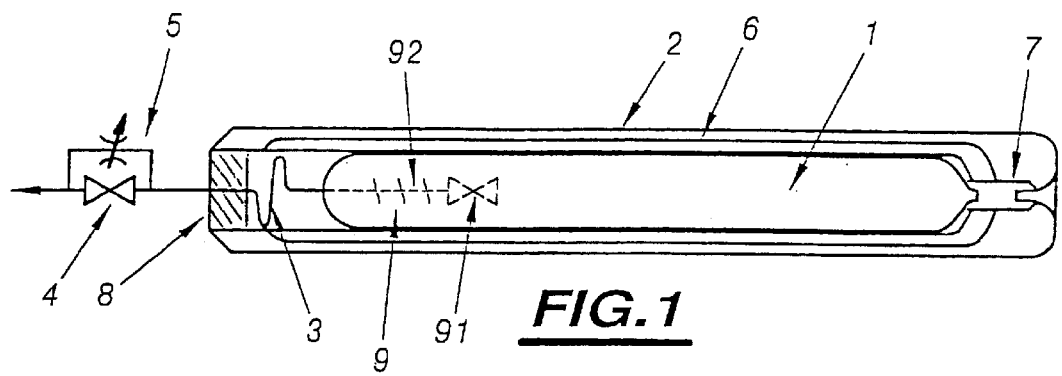
FIG. 1 is a schematic longitudinal cross section of a device according to a first embodiment of the invention, which can particularly be a device for storing hydrogen.

The device according to the invention shown in FIG. 1 comprises a container for gas in gaseous phase, in the form of a cylinder 1, surrounded by a thermally insulating envelope 2 generally double walled.

The cylinder is a high pressure cylinder compromising an outlet conduit provided with a swan's neck 3 at the end of which is disposed an outlet control valve 4 with which is associated in parallel a branch 5 ensuring a closeable calibrated escape at the outlet of the conduit.

The gas contained in the cylinder is in this case hydrogen compressed to 200 bars in gaseous phase and at a temperature of the order of 80 K, more precisely in this case 77 K, which avoids any ortho-para transformation, but in fact the range of possible pressures for hydrogen extends from about 50 to 250 bars and the range of the temperatures from 40 K to 120 K. In the case of 80 K, 200 bars is well adapted to constitute a supply capacity for a fuel cell for an electric vehicle motor, and the escape necessary, in the absence of cooling apparatus of the device, can well be used to maintain the cell as to temperature and/or to recharge the storage batteries.

The envelope 2 insulating the cylinder from the external surroundings is designed as a function of the admissible quantity of loss, which is to say the quantity of loss possible to recharge the batteries or to supply another device. There can for example be chosen an envelope 2 with high thermal insulation power of the so-called super insulation type (that is, S.I. type) under vacuum so as to limit the consumption of gas when the cell is not used; the "super insulation" can be of the conventional type or with one or several internal shields 6 connected as we will be seeing later, as needed. In the case of use for an electric motor vehicle with a fuel cell, the best solution consists in using an envelope 2 of super insulation under vacuum with an arrangement of associated shields 6, with at least one end insulated by a foam material (FIG. 1). In this case, the loss necessary to maintain the pressure below 200 bars permits generating electric power of about 300 watts.

In the device shown in FIG. 1, the bottom of the cylinder is separated from the bottom of the envelope by a centering partition 7 constituted by a short column pierced with a longitudinal canal in the ends of which are inserted projections respectively of the cylinder and of the envelope. The opposite end of the envelope has a neck whose diameter is slightly greater than the diameter of the cylinder so that the cylinder can be introduced into the envelope, and this neck, for example of stainless steel, epoxy glass or Inconel (trademark), is provided with a plug 8 of thermally insulating foamed material traversed by the outlet conduit of the cylinder.

The outlet conduit of the cylinder can be prolonged within the latter by means 9 for recovering cold produced by the expansion of the gas, comprising an expansion valve 91 and a heat exchanger 92; it is thus to the cold source constituted by these means 9, for example the heat exchanger 92, that the shield or shields 6 of the envelope 2 are connected.

It should be noted that the device according to the invention, for storage of gas in compressed gas phase, permits multiplying about three times the transport capacity for hydrogen relative to known devices, and moreover it is possible to decrease particularly the pressure (to about 50 bars) while transporting however the same quantity of hydrogen as in the same volume pressurized at 200 bars at ambient temperature, with a substantial gain as to the mass of the device.

As has been seen, as a modification, the envelope could contain one or several shields (for example up to five shields) and a foam material on opposite sides of each shield.

Figure 2:
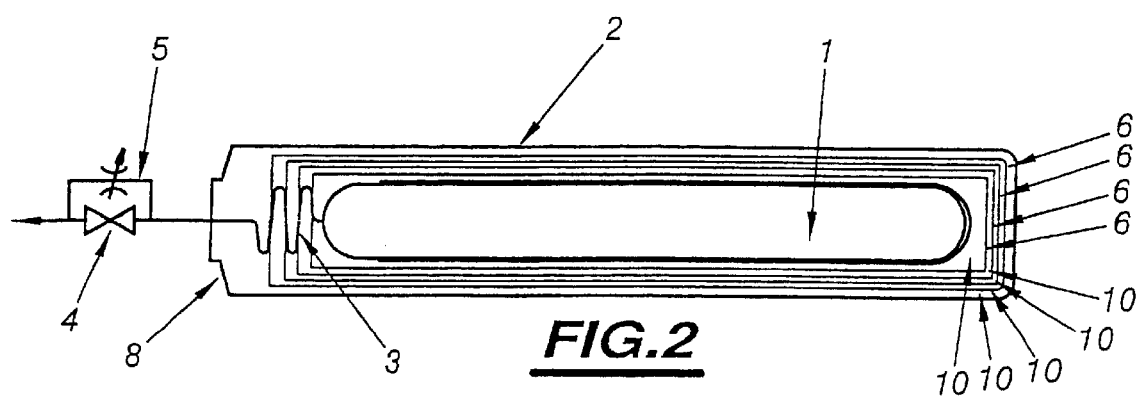
FIG. 2 is a schematic longitudinal cross sectional view of a device according to a second embodiment of the invention.

The embodiment of FIG. 2, in which the elements corresponding to those of FIG. 1 have the same reference numerals, comprises such an envelope 2 with four shields connected to an internal source of cold and five layers 10 of foam (or other thermal insulations); the cylinder 1 of this FIG. 2 is identical to that of FIG. 1, except that because of the difference of internal structure of the envelope, it does not have a centering projection, and its outlet conduit is provided with a double swan's neck 3.

The envelope can also be independent of the high pressure cylinder; it could for example consist of a Dewar that is dry or refrigerated with liquid nitrogen.

Figure 3:
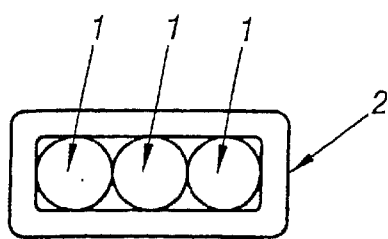
FIG. 3 is a schematic transverse cross sectional view of a third embodiment of the invention.
Figure 4:
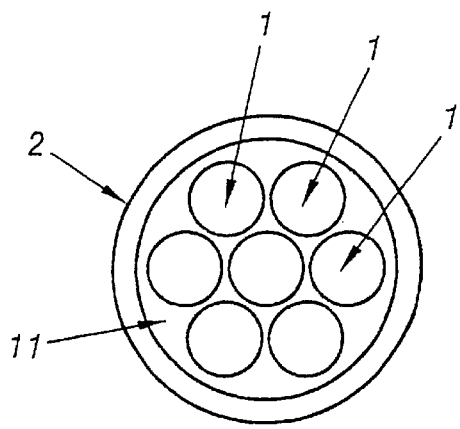
FIG. 4 is a schematic transverse cross sectional view of a device according to a fourth embodiment of the invention.

FIG. 3 shows an embodiment in which the envelope is a dry Dewar having a transverse cross section of rectangular shape and in which three cylinders 1 extend in parallel in a same plane and are juxtaposed side by side. FIG. 4 shows an embodiment in which the envelope 2 is a Dewar having a transverse cross section of circular shape and in which seven cylinders 1 extend in parallel and are disposed side by side; one of the cylinders is disposed centrally with respect to the transverse cross section of the envelope, and the six others are distributed about the central cylinder; the space between the cylinders, and between the cylinders in the envelope, can be filled with liquid nitrogen 11; as a modification, the cylinders can be replaced by tubes connected "in series" so as to constitute a serpentine, one of the two end tubes being provided with a conduit with a swan's neck with a valve and a branch (not shown), and if desired recovering means of the cold of expanding the gas, like the cylinders of the embodiments of FIGS. 1 and 2. The presence of liquid nitrogen ensures substantially autonomy without degassing, and in this case the escape can be stopped by closure of the outlet conduit downstream of the valve 4.

Figure 5:
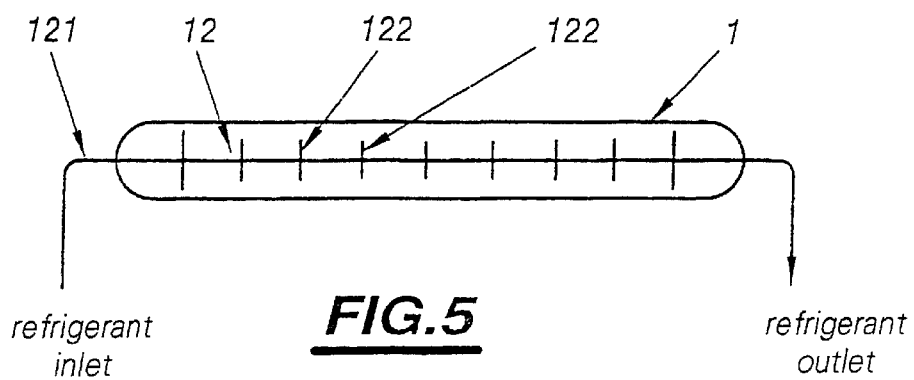
FIG. 5 is a schematic longitudinal cross sectional view of a modified container to be used with another embodiment of the device according to the invention.

FIG. 5 shows an embodiment in which the cylinder is associated with means forming an exchanger 12 permitting the preliminary cooling of the latter before its filling with cold gas when it is at ambient temperature. These means forming exchanger 12 can be external to the cylinder, or internal as in FIG. 5, showing a high pressure cylinder 1 traversed longitudinally by a conduit 121 through which can flow liquid nitrogen, this conduit carrying externally heat exchanged fins 122, the conduit 121 and the fins 122 constituting the means forming an exchanger 12.

The invention can be applied to the storage, for eventual transport, of gas other than hydrogen, in suitable ranges of temperature and pressure.

For example, the devices according to the invention can be used with minimal modifications, for helium between 20 K and 80 K, at about 200 bars, which corresponds to a density comprised between 1.5 and 0.7 times the density of liquid helium at atmospheric pressure;

for neon between 50 K and 70 K, at about 200 bars, which corresponds to a density comprised between 0.9 and 0.5 times the density of liquid neon at atmospheric pressure, for carbon monoxide between 140 K and 200 K, at about 200 bars, which corresponds to a density comprised between 0.8 and 0.5 times the density of liquid carbon monoxide at atmospheric pressure, for methane between 145 K and 200 K, at about 200 bars, which corresponds to a density comprised between 0.95 and 0.75 times the density of liquid methane at atmospheric pressure, or else 1.1 to 0.85 times the density of the liquid methane at 7 atmospheres absolute pressure, because of course the invention is not limited to the embodiments described above and illustrated, and others could be postulated without departing from its scope.

What is claimed is:

1. A device for storing gas under pressure, comprising at least one pressure resistant heat-insulated container with an opening connected to a control valve and a selectively closeable calibrated restriction that is connected in parallel with said control valve for allowing the gas to expandingly escape from the container, said control valve and said selectively closeable calibrated restriction terminating at a single outlet for the gas, the gas being stored in gaseous phase in the container over a range of pressure from about 40 to 250 bars and over a range of temperatures from about 15 to 210 K.

2. Device according to claim 1, wherein the container comprises means for recovering cold from the expansion of the gas.

3. Device according to claim 1, wherein the container is provided with means forming a heat exchanger suitable to be used before the container is filled with cold gas so as to cool the container before filling the container.

4. Device according to claim 1, wherein the container comprises an outlet conduit provided with an outlet control valve, and the selectively closeable calibrated restriction comprises a branch in parallel with the valve.

5. Device according to claim 1, wherein the container is a cylinder.

6. Device according to claim 1, wherein the device it comprises several containers within an envelope.

7. Device according to claim 1, wherein the device it comprises at least one container within a Dewar containing, in addition to the container, liquid nitrogen.

8. Device according to claim 1, wherein the container contains a gas at a pressure of the order of 200 bars.

9. Device according to claim 1, wherein the container contains hydrogen in gaseous phase, and at a temperature comprised within a range extending from about 40 K to 120 K.

10. Device according to claim 9, characterized in that the container (1) contains hydrogen in gaseous phase, and at a temperature of about 80 K.

11. Device according to claim 1, wherein the container contains helium in gaseous phase, and at a temperature comprised within a range extending from about 20 K to 80 K.

12. Device according to claim 1, wherein the container contains neon in gaseous phase, and at a temperature comprised within a range extending from about 50 K to 70 K.

13. Device according to claim 1, wherein the container contains carbon monoxide in gaseous phase, and at a temperature comprised within a range extending from about 140 K to 200 K.

14. Device according to claim 2, characterized in that the container (1) is provided with means (12) forming a heat exchanger suitable to be used before its filling with cold gas so as to cool it before its filling.

15. Device of claim 1, wherein the range of pressures is from 50 to 200 bars.

16. Device of claim 1, wherein the range of temperatures is from 20 K to 200 K.

17. Device of claim 16, wherein the range of pressures is from 50 to 200 bars.

18. The device of claim 1, wherein the calibrated restriction is in fluid communication with a gas consuming unit.

19. The device of claim 18, wherein the stored gas is hydrogen and the gas consuming unit a fuel cell.

20. The device of claim 19, wherein hydrogen is stored at a pressure of about 200 bars and a temperature of about 80 K.

21. A method of storing gas under pressure, wherein the gas is stored in a thermally insulated container in gaseous phase at a pressure between about 40 to 250 bar and a temperature from about 15 K to 210 K, comprising the step of temporarily allowing a controlled leak of the gas stored in the container when the gas is not drawn out for external use to thereby compensate for heat losses.

22. A method of storing hydrogen under pressure, wherein hydrogen is stored in a thermally insulated container in gaseous phase at a pressure between about 50 to 200 bar and a temperature from about 40 to 120 K, comprising the step of temporarily allowing a controlled leak of the hydrogen stored in the container when hydrogen is not drawn out for normal external use.

23. The method of claim 21, wherein the gas is stored in the container at a pressure of about 200 bar.

24. The method of claim 21, wherein the gas is hydrogen stored at a temperature of about between 40 and 100 K.

* * * * *